United States Patent [19]

Verboom

[11] Patent Number: 5,023,857

[45] Date of Patent: Jun. 11, 1991

[54] OPTICAL INFORMATION STORAGE APPARATUS INCLUDING ECCENTRICITY COMPENSATOR

[75] Inventor: Johannes J. Verboom, Colorado Springs, Colo.

[73] Assignee: U.S. Philips Corporation, New York, N.Y.

[21] Appl. No.: 243,400

[22] Filed: Sep. 12, 1988

[30] Foreign Application Priority Data

Sep. 23, 1987 [NL] Netherlands ............... 8702261

[51] Int. Cl.$^5$ ............................................... G11B 7/095
[52] U.S. Cl. .............................. 369/44.25; 360/77.08;
369/44.32; 369/50; 369/58
[58] Field of Search ................... 369/32, 48, 50, 54,
369/58, 111, 239, 275.3, 43, 44.25–44.27, 44.32;
250/202; 358/342; 360/25, 31, 53, 77.03, 77.08,
78.04, 78.14

[56] References Cited

U.S. PATENT DOCUMENTS

| Re. 32,937 | 5/1989 | Silvy et al. ............... 369/275.3 X |
|---|---|---|
| 3,881,184 | 4/1975 | Koepcke et al. ............... 369/32 |
| 4,286,318 | 8/1981 | Immink et al. ............... 360/69 X |
| 4,334,276 | 6/1982 | Turnbull ............... 369/58 X |
| 4,338,629 | 7/1982 | Oprandis et al. ............... 369/50 X |
| 4,365,324 | 12/1982 | Michaelis ............... 360/77.06 X |
| 4,416,006 | 11/1983 | Kitamura et al. ............... 369/239 X |
| 4,445,144 | 4/1984 | Giddings ............... 369/111 X |
| 4,464,714 | 8/1984 | Huijser et al. ............... 369/48 X |
| 4,476,555 | 10/1984 | Joichi et al. ............... 250/202 X |
| 4,527,263 | 7/1985 | Nakagawa ............... 369/58 X |
| 4,639,792 | 1/1987 | Moxon ............... 360/53 X |
| 4,674,076 | 6/1987 | Hsieh et al. ............... 369/32 |
| 4,710,908 | 12/1987 | Ohshima et al. ............... 369/58 X |
| 4,745,588 | 5/1988 | Yoshikawa et al. ............... 369/32 |
| 4,755,977 | 7/1988 | Abed ............... 369/32 |
| 4,764,914 | 8/1988 | Estes et al. ............... 369/58 |
| 4,775,966 | 10/1988 | Miura et al. ............... 360/77.04 X |
| 4,807,211 | 2/1989 | Getreuer ............... 250/202 X |
| 4,823,212 | 4/1989 | Knowles et al. ............... 360/77.08 |

Primary Examiner—Aristotelis M. Psitos
Assistant Examiner—W. R. Young
Attorney, Agent, or Firm—Algy Tamoshunas

[57] ABSTRACT

An optical information recording and/or read system comprises an optically readable record carrier (1) and an optical read and/or recording apparatus (FIG. 2). The record carrier (1) is provided with substantially concentric tracks (2). The record carrier (1) is divided into sectors (4). In the tracks of each sector address information is recorded by means of prior recorded radially juxtaposed address information patterns (8). The read and/or recording apparatus (FIG. 2) comprises a driver (20, 21) for rotating the record carrier (1), scanner (23, 25) for scanning the tracks (3) with a radiation beam (2) for the purpose of recording and/or reading, a closed-loop tracking system (23, 26) for keeping the radiation beam (24) aimed at the track (6) to be scanned, and an angular-position-detection system (23, 26, 27) for determining the angular position of the record carrier (1). The recording and/or read apparatus determine eccentricity-error (23, 26, 27, 50) by deriving a correction signal (Vc) from the sector addresses read while the tracking system is inoperative which correction signal is related to the radial displacement of the point of incidence of the radiation beam (24) of the record carrier (1) as a result of an eccentric position of the center of rotation (22) and out-of-roundness of the information tracks. When the tracking system is operative the correction signal (Vc) is employed as a control signal for an open-loop control system to compensate for the radial error caused by eccentricity and out-of-roundness.

4 Claims, 7 Drawing Sheets

OPTICAL INFORMATION STORAGE APPARATUS INCLUDING ECCENTRICITY COMPENSATOR

BACKGROUND OF THE INVENTION

The invention relates to an information recording and/or read system comprising a record carrier provided with information tracks which are arranged substantially concentrically relative to a common center, the record carrier being divided into sectors and the tracks of each sector containing address information in the form of optically detectable radially juxtaposed address information patterns, the address information being indicative of the radial position of the track relative to the center, and a recording and/or read apparatus for recording and/or reading information in/from the information tracks, which apparatus comprises a drive means for rotating the record carrier about a center of rotation, means for scanning the information tracks by means of a radiation beam for the purpose of recording and/or reading information in/from the information tracks, a closed-loop tracking system for keeping the radiation beam aimed at the information track to be scanned, and an angular-position detection system for determining the angular position of the record carrier.

The invention further relates to a recording and/or read apparatus and to a record carrier for use in such a system. A conventional system of this type is described in the opening paragraph of European Patent Application 0,096,969 (which corresponds to U.S. Pat. No. 4,674,076). The system described therein utilizes an inscribable record carrier of which each track in each sector is provided with an optically detectable control pattern in the form a "header" arranged at the beginning of the sector. Each control pattern comprises an address information pattern representing the sector address and the track address, and a plurality of optically detectable servo marks situated at predetermined positions within the control pattern for the purpose of tracking. When the control patterns are scanned, a tracking error is derived from the radiation beam reflected during scanning of the servo marks. Depending on the tracking error the tracking system controls the radial position of incidence in such a way that the radiation beam remains at the track to be followed. Such a control system is known as a "sampled servo control-system".

Such a tracking system performs satisfactorily, provided that the tracking errors between two consecutive scans of the servo marks do not become too large. These tracking errors are caused inter alia by an eccentric position of the center of rotation relative to the concentric tracks or by out-of-roundness of the information tracks. Therefore, as a result of an excessive eccentricity or an excessive out-of-roundness, the tracking system may no longer be capable of keeping the scanning beam at the track to be followed. Further, it is to be noted that on account of local record-carrier flaws it may be desirable to disable the tracking system temporarily. In order to enable scanning of the desired track to be continued after passage of the detective portion it is necessary that the radiation beam remains substantially directed at the track to be followed while the tracking system is inoperative.

SUMMARY OF THE INVENTION

It is an object of the invention to provide a recording and/or read system comprising a tracking system which is more immune to tracking errors caused by an eccentric position of the center of rotation or out-of-roundness of the information tracks.

According to this invention this object is achieved in that the recording and/or read apparatus comprises means for deriving a correction signal from the address information read while the tracking system is inoperative which correction signal is related to the radial displacement of the point of incidence of the radiation beam on the record carrier relative to the center while the tracking system is inoperative, means for storing the correction signal thus derived in a memory as a function of the angular position, the tracking system comprising means for fetching the correction value associated with the instantaneously determined angular position from the memory and an open-loop control system for controlling the radial position of the point of incidence relative to the center of rotation depending on the fetched correction signal to compensate for the radial displacement of the point of incidence caused by an eccentric position of the center of rotation and out-of-roundness of the information tracks. The invention is based inter alia on the recognition of the fact that while the tracking system is inoperative an eccentricity and out-of-roundness dependent radial displacement of the point of incidence of the radiation beam over the record carrier as a function of the angular position can be derived from the addresses being read. Subsequently, while the tracking system is operative, the radiation beam is roughly aimed at the track to be scanned by means of an open-loop control system which provides correction for errors caused by eccentricity and out-of-roundness, the radiation beam being maintained accurately at the track to be scanned by means of the closed-loop tracking system. Thus, the tracking errors caused by eccentricity and out-of-roundness then hardly affect the operation of the closed-loop tracking system.

Since the residual tracking error to be corrected by the closed-loop tracking system is small, tracking will also be maintained in the event of temporary disabling of the closed-loop tracking system while defective record portions are being scanned.

In this respect it is to be noted that an eccentricity-compensation device for optical read and/or recording systems in which the radial position of the point of incidence of the beam is generally maintained on the track to be scanned by means of an open-loop control system are known, inter alia from U.S. Pat. No. 4,365,324. In the eccentricity-compensation device described herein the number of track transitions per revolution of the record carrier is derived from the tracking error signal in the disabled condition of the closed-loop tracking system. The amplitude of the correction signal is then derived from this number.

Moreover, the phase relationship between the angular position and the correction signal is determined, after which the entire correction signal is known. However, this method of deriving the correction signal is only suitable for record carriers where the tracking-error signal is constantly available. This method of determining the correction signal is therefore not suitable for recording and/or read systems in which the tracking error can be determined only for a number of discrete angular positions, such as in the recording and- /or read system described in the aforementioned European Patent Application 0,096,969, where the tracking error is determined only during scanning of the servo marks.

An embodiment of the recording and/or read system is characterized in that the correction signal is substantially proportional to the radial displacement of the point of incidence relative to the center while the tracking system is inoperative, the scanning device comprising means for optimizing the correction signal in an optimization time interval in which the radial position of the point of incidence is controlled exclusively by the open-loop control system, for which purpose the optimizing means include means responsive to the address information read in the optimization time interval to adjust the amplitude of the correction signal to a value for which the amplitude of the radial displacement of the point of incidence as indicated by the addresses read is minimal. In this embodiment the amplitude of the correction signal is optimized in a simple way. For determining the eccentricity signal in an optimum manner it is desirable that only correctly read addresses are used for determining the radial displacement of the point of incidence on the record carrier. To this end an embodiment of the recording and/or read system is characterized in that the eccentricity-determining means include address-error detection means for detecting incorrectly read address information and means for correcting the incorrectly read addresses thus detected.

The correctness of the address read is determined with a high reliability in an illustrative embodiment of the recording and/or read system, wherein the address information comprises a plurality of address bytes, two of the address bytes, including one address byte representing the most significant part of the address, being each other's complement and the address-error detector is adapted to derive the correctness of the address information being read from the complementary address bytes.

An embodiment, which minimizes the likelihood of an address being read incorrectly, is characterized in that the address-information patterns comprise optically detectable code symbols which each represent at least one byte of the address information, each symbol comprising a plurality of positions, a number of positions being occupied by an optically detectable mark and the relationship between the addresses and symbols being selected in such a way that two radially adjacent code symbols always exhibit a difference for one position at the most.

BRIEF DESCRIPTION OF THE DRAWING

Embodiments of the invention and further advantages thereof will now be described in more detail, by way of example, with reference to FIGS. 1 to 11 of the accompanying drawing, in which.

DETAILED DESCRIPTION OF THE PREFERRED EMBODIMENTS

Figure 1A:
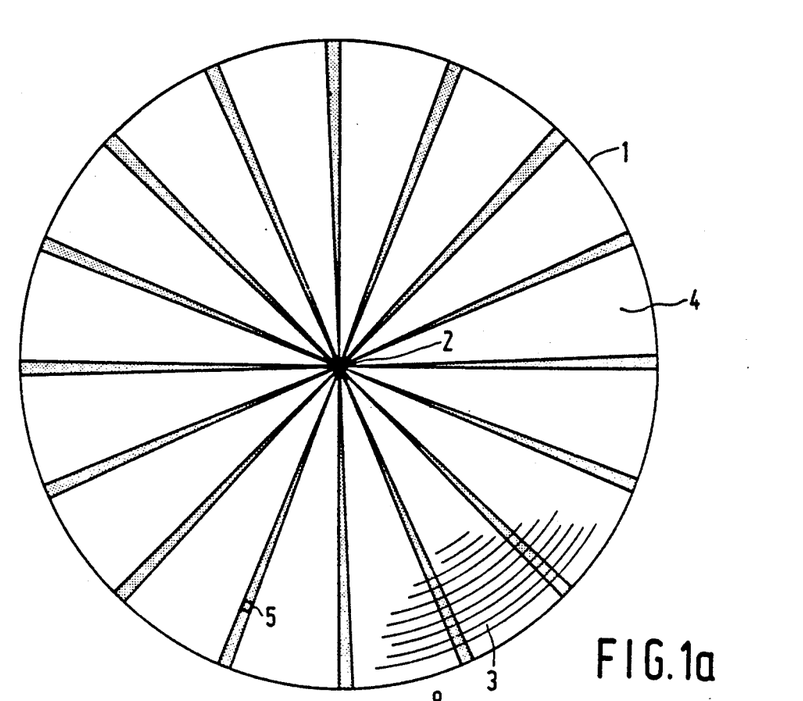
FIGS. 1a, 1b, 1c and 1d show an embodiment of a record carrier for use in the optical recording and/or read system in accordance with the invention.

FIG. 1a shows an embodiment of an optically inscribable and readable disc-shaped record carrier 1 for use in the recording and/or read system in accordance with the invention. The record carrier 1 comprises tracks 3 which are arranged substantially concentrically relative to a center 2 and which serve for recording information. In FIG. 1a the tracks 3 are indicated only symbolically. In actuality, the track width is of the order of magnitude of 1 $\mu$m and the track pitch is of the order of magnitude of 2 $\mu$m. The record carrier 1 is divided into a plurality of sectors 4. The beginning of each sector in every track is indicated by pre-recorded optically detectable control patterns 6, which radially juxtaposed.

Figure 1B:
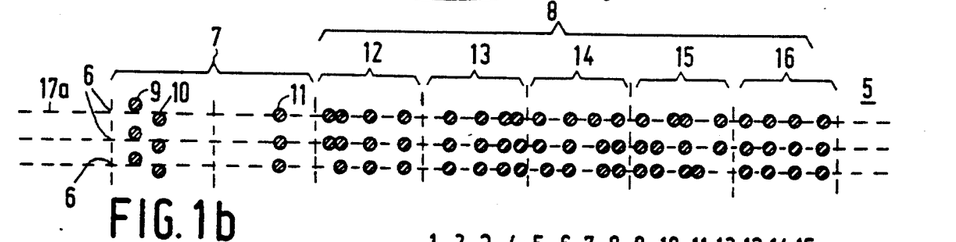
Figure 1C:
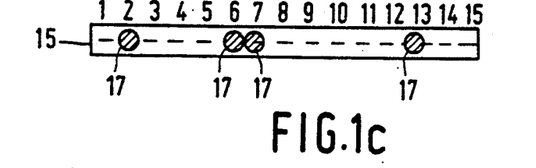

FIG. 1b, which shows a part 5 of the record carriers in a highly enlarged scale, provides an example of three adjacent control patterns 6. Each control pattern 6 includes a servo pattern 7 and an address-information pattern 8. The address-information pattern comprises five consecutive optically detectable code symbols 12, 13, 14, 15 and 16, which each represent an address byte of the address information. In the present example the first code symbol 12 represents the sector address. The second code symbol 13 represents the most significant address byte of the track address, while the third code symbol 14 represents the least significant address byte of the track address. The fourth and the fifth code symbol 15 and 16 represent the complement of the least significant address byte and of the most significant address byte respectively. The code symbols shown in FIG. 1b each comprise four optically detectable pits 17, distributed over fifteen different potential pit positions (see FIG. 1c).

Figure 1D:
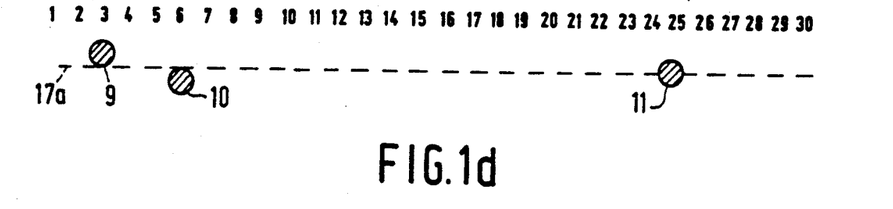

Such a code is referred to as a 4/15 block code. An example of such a 4/15 block code is described in detail in British Patent GB 2,148,670. The code symbols of such a code can be detected very reliably by differential detection. For a comprehensive description of such a differential detection system reference is made to U.S. Pat. No. 4,464,714. The servo pattern 7 comprises two tracking pits 9 and 10 and one synchronization pit 11, which pits are situated at predetermined positions within the servo pattern (see FIG. 1d). The tracking pits 9 and 10 are slightly offset from the center of the track 3 indicated by the line 17a. In order to enable the synchronization pit 11 to be distinguished from the other pits the distance between a tracking pit 10 and a synchronization pit 11 is selected to be larger than the maximum distance between the pits in the code symbols. When information is read from or recorded in the tracks 3 by a radiation beam the control signals for the tracking, as will be described hereinafter, can be derived from the modulation of the read beam produced by the servo patterns 7, so that a servo groove indicating the location of the track between the control patterns 6 is redundant.

Figure 2:
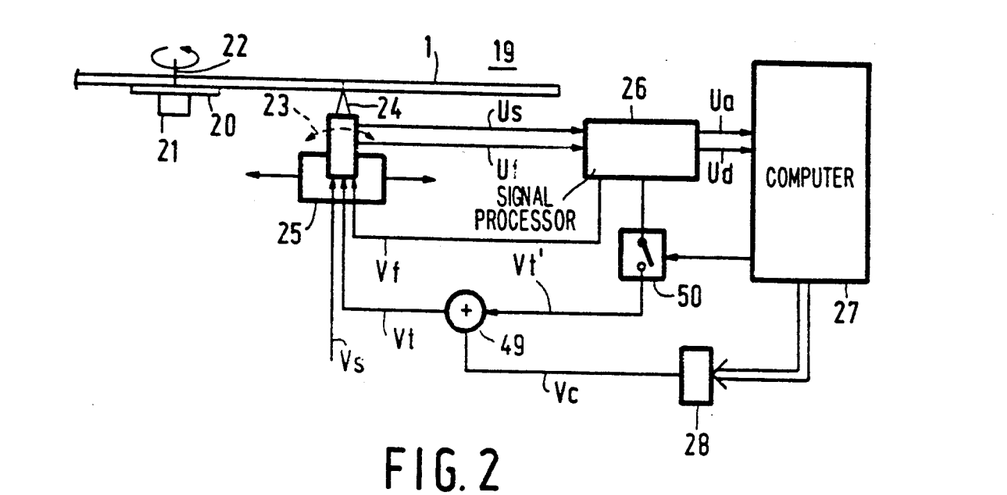
FIG. 2 shows an embodiment of a recording and/or read apparatus in accordance with the invention.

FIG. 2 shows an embodiment of a recording and read system 19 in accordance with the invention. The record carrier 1, which is supported on the turntable 20, is rotated about a center of rotation 22 by means of a motor 21. An optical read/write head 23 of a customary type, for reading and recording information from/in the tracks 3 of the record carrier 1 by a radiation beam 24, is arranged opposite the rotating record carrier 1 on a slide 25 which is radially movable relative to the record carrier 1. For the purpose of tracking, the read/write head 23 is provided with the customary means for radially deflecting the radiation beam 24 depending on a tracking signal Vt. Further, the write/read head 23 comprises means for focusing the radiation beam on the disc depending on a focus control signal Vf. Moreover, a write signal Vs is applied to the write/read head 23 for modulating the intensity of the radiation beam during recording.

The write/read head 23 further comprises an optical detector of a customary type, for example a four-quadrant photo-diode, for detecting the radiation reflected from the record carrier 1 during recording and reading. The optical detector derives two detection signals from the reflected radiation, i.e. a first signal (Us) representative of the total amount of reflected radiation and a second signal (Uf) which is a measure of the focus error. The detection signals Us and Uf are applied to a signal-processing circuit 26, to derive from these detection signals Us and Uf the tracking signal Vt', for keeping the radiation beam 24 on the track to be scanned, the focus-control signal Vf for keeping the radiation beams in focus on the record carrier, an address signal Ua representing the sector address and the track address of the track portion being scanned, and a data signal Ud representing the information recorded in the track being scanned. The address signal Ua and the data signal Ud are applied to a computer system 7 of a customary type, for example a microcomputer.

Figure 3:
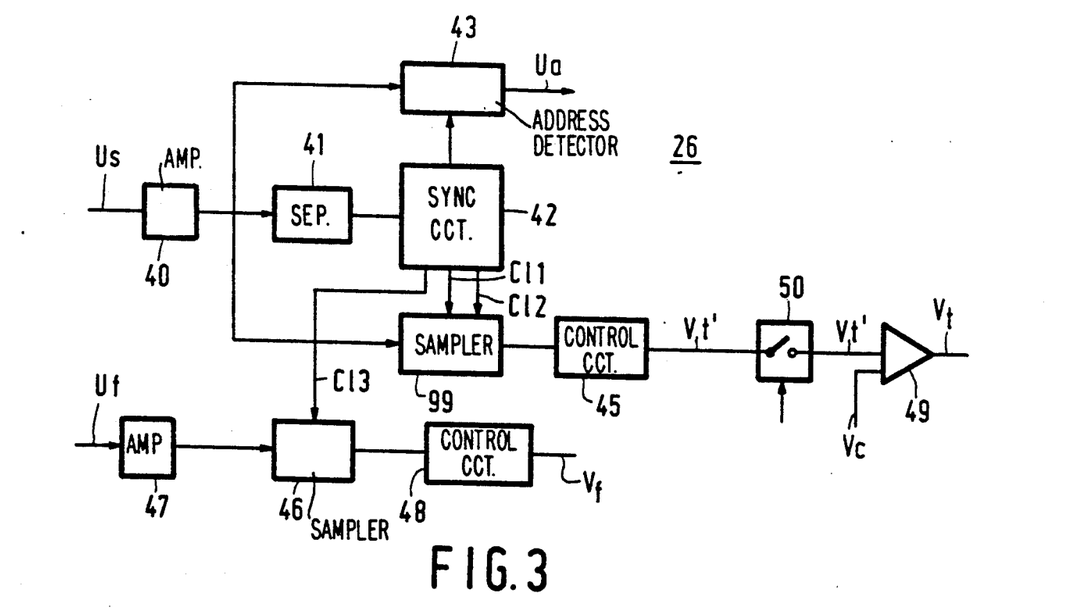
FIG. 3 shows an example of a signal-processing circuit for use in the recording and/or read apparatus.

FIG. 3 shows an example of the signal processing circuit 26. In FIG. 3 the reference numeral 40 indicates an amplifier circuit for amplifying the detection signal Us. The amplified detection signal is applied to a separator circuit 41 which, if the time interval between two detected pits exceeds a specific value, supplies the amplified detection signal for a specific time interval, which includes the scanning instant of the synchronization pit 11, to a synchronizing circuit 42 for generating a plurality of clock signals c11, c12 and c13, which respectively indicate the instants at which the tracking pit 9, the tracking pit 10, and the flat portion of the servo pattern following the synchronization pit 11 are scanned. Such a synchronizing circuit 42 can be realized in a customary manner using well-known phase-locked-loop techniques.

For determining a tracking-error signal the difference between the signal value of the detection signal Ua at the instant of scanning of the tracking pit 9, indicated by c11, and the signal value at the instant of scanning of the tracking pit 10, indicated by c12, is determined by a sampling circuit 44 controlled by the clock signals c11 and c12. This difference is representative of the deviation of the center of the point of incidence of the radiation beam on the disc relative to the center 17a of the track 3. The tracking-error signal representing this difference is applied to a control circuit 45, which derives the control signal Vt' from the tracking-error signal and applies it to the write/read head 23 via a switch 50 controlled by the computer system 27 and the adder circuit 49. By means of a sampling circuit 46, which is controlled by the clock signal c11, the focus-error signal Uf, generated during scanning of the flat portion of the control pattern and amplified by an amplifier circuit 47, is sampled. The sampled focus-error signal Uf is applied to a control circuit 48 to derive the focus-control signal Vf.

The signal-processing circuit 26 further comprises an address-detection circuit 43 of a customary type for detecting the addresses of the tracks 3 scanned by the radiation beam 24. If the addresses have been recorded by means of appropriate code symbols, the address detection circuit may comprise a differential detection circuit for detecting the code symbols and a decoding circuit for converting the detected codes into the address bytes of the sector address and the track address. Instead of a differential detection circuit a level detector can be used, which level detector determines from the signal level for the detection signal Us at the instants at which the potential pit positions of the code symbols are scanned whether the relevant potential pit positions are occupied by pits. The clock signals for the address detection circuit 43 are also generated by the synchronizing circuit 42.

Figure 4A:
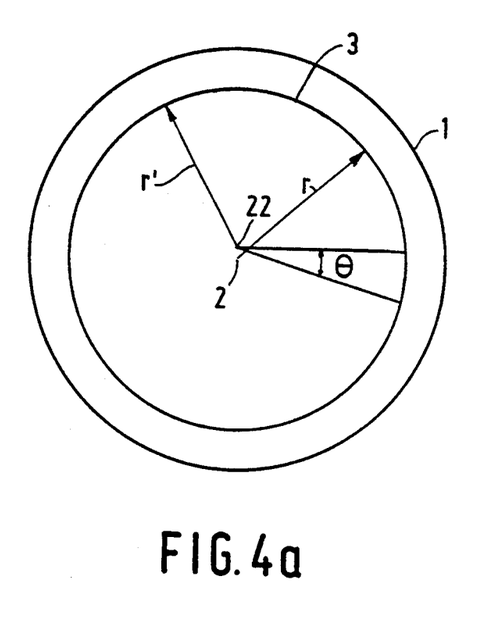
FIGS. 4a and 4b illustrates the influence of an eccentric position of the center of rotation.
Figure 4B:
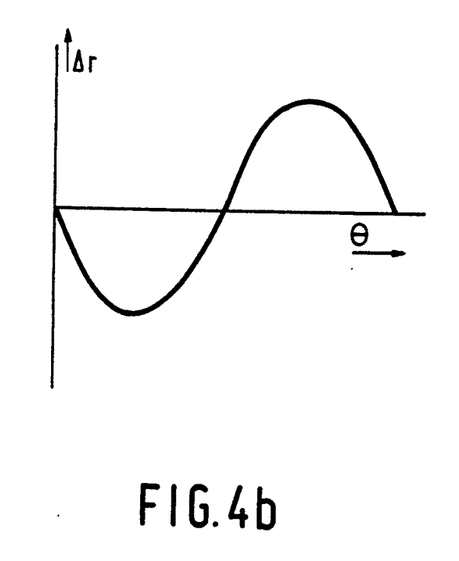

FIG. 4a and FIG. 4b illustrate the influence of an eccentric position of the center of rotation 22 relative to an arbitrary track 3 on the radial position r' of the track 3 relative to the center of rotation 22. The radial position of the track 3 relative to the center 2 is indicated by r. FIG. 4b gives the difference $\Delta r$ between r and r' as a function of the angular position $\theta$ of the record carrier 1. As is apparent from FIG. 4b, the radial position r' of the track 3 exhibits a sinusoidal deviation relative to the center of rotation 22. In addition to the eccentricity, an out-of-roundness of the information track also gives rise to a deviation in the distance between the track and the center of rotation. However, this effect is not illustrated in FIG. 4. Hereinafter the deviation caused by eccentricity and out-of-roundness will be referred to briefly as "eccentricity error". In optically readable record carriers in which the distance between the tracks 3 is small in comparison with the eccentricity of the center of rotation, this amplitude of the eccentricity error generally corresponds to some tens of tracks. When reading and recording information from/in the track, it is customary to provide a correction for the eccentricity error by a closed-loop tracking system. In the case of a large eccentricity error, it is not unlikely that the closed-loop tracking system is no longer capable of following the track, thus impairing a correct read-out and recording.

Figure 5:
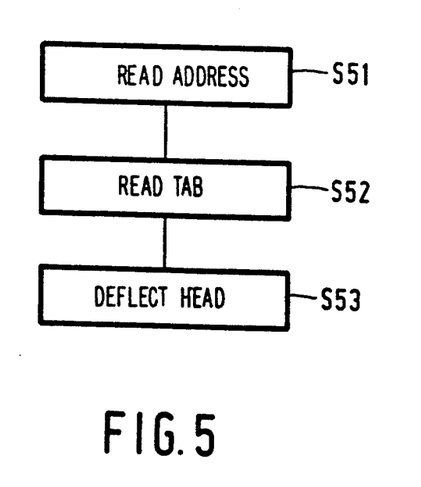
FIGS. 5, 8a, 8b and 9 are flow-charts of the programs to be executed by a computer system in the recording and/or read apparatus.
Figure 6A:
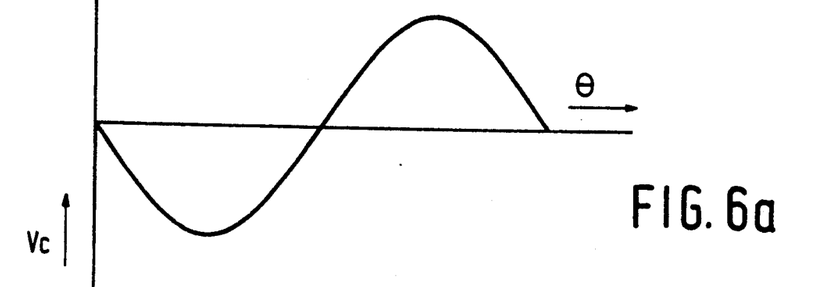
FIGS. 6a, 6b and 6c, respectively, the eccentricity error signal and the correction signal, and the residual error of the compensated eccentricity signal.
Figure 6B:
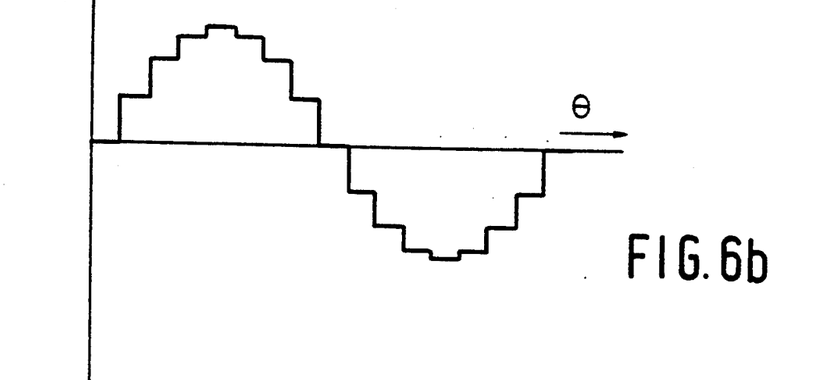
Figure 6C:
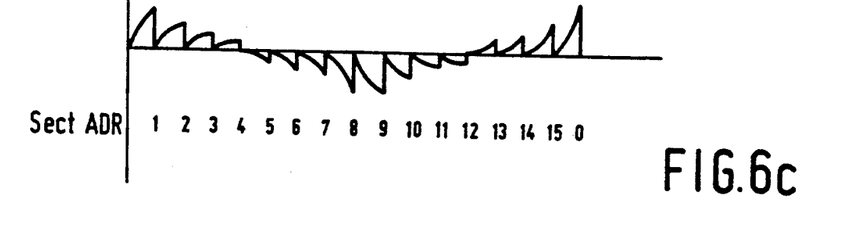

In order to mitigate this drawback the recording and read system in accordance with the invention, in addition to the closed-loop tracking system already described, comprises an open-loop tracking system which compensates mainly for the eccentricity error. The open-loop tracking system comprises the computer system 27, in which a correction signal Vc as a function of the angular position $\theta$ is stored in a table TAB, in which the value of the correction signal Vc for each sector of the record carrier is stored. The flow chart of a program for reading the correction values out of the table TAB during information recording or reading is given in FIG. 5. This program comprises a read step S51 in which the address of the sector 4 being scanned is read. During the steps S52 and S53 the associated correction value is read from the table TAB and applied to the write/read head 23 via a digital-to-analog converter 28 and the adder circuit 49, thus causing the radiation beam 24 to be deflected in a radial direction over a distance which is mainly dictated by the signal value of Vc. FIG. 6b gives the radial displacement of the point of incidence of the radiation beam 24 caused by the correction signal Vc relative to the center of rotation 22 as a function of the angular position θ of the record carrier 1. The correction signal Vc is selected in such a way that the resulting radial displacement of the point of incidence of the radiation beam is substantially opposite to the eccentricity error. The residual eccentricity error after compensation is given in FIG. 6c.

Since the magnitude of the error to be corrected by the closed-loop tracking system has been reduced substantially the likelihood that a track can no longer be followed has decreased considerably.

In the embodiment described in the foregoing the correction signal within each sector is maintained constant. It will be evident that alternatively the correction signal within each sector can be adapted several times, for example by also adapting a correction signal at fixed angular positions within the sector. If a record carrier is used in which a plurality of additional servo patterns are recorded in the information track at fixed angular positions within the sector, the correction signal can be adapted during scanning of the servo track in response to every detection of an additional servo pattern. This has the advantage that the residual error to be corrected by closed-loop tracking system is minimized. It is to be noted that in the case that only the value of the correction signal Vc for the points where the sectors begin is known the values of the correction signal for the additional servo patterns can be derived simply from the values for the starting points at beginnings of the sectors by means of interpolation techniques.

The computer system 27 comprises software for determining the correction values of the correction signal Vc. The eccentricity error is then first derived from the track addresses read while the tracking system is inoperative. These track addresses indicate the radial position of the track relative to the center 2.

Figure 7:
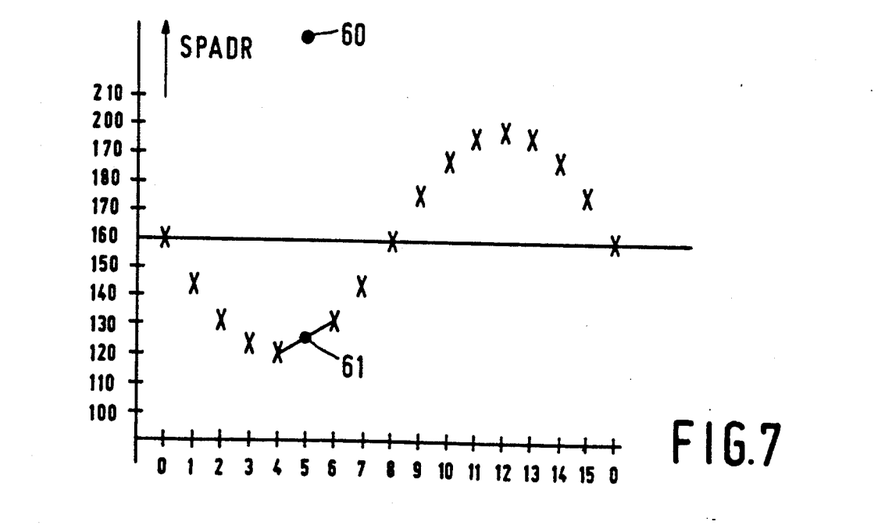
FIG. 7 shows the track addresses, read while the tracking system is inoperative, as a function of the associated sector address.

The track addresses read during one revolution of the record carrier 1 while the tracking system is inoperative are given as a function of the associated sector address in FIG. 7. The variation of the sector addresses SPADR in FIG. 7 as a function of the sector addresses gives the radial position of the point of incidence of the radiation beam on the disc relative to the center 2 of the track pattern during scanning while the tracking system is inoperative. If the distance between the tracks (track pitch) is known, this enables the eccentricity error as a function of the sector address and hence the angular position to be determined.

Figures 8A, 8B:
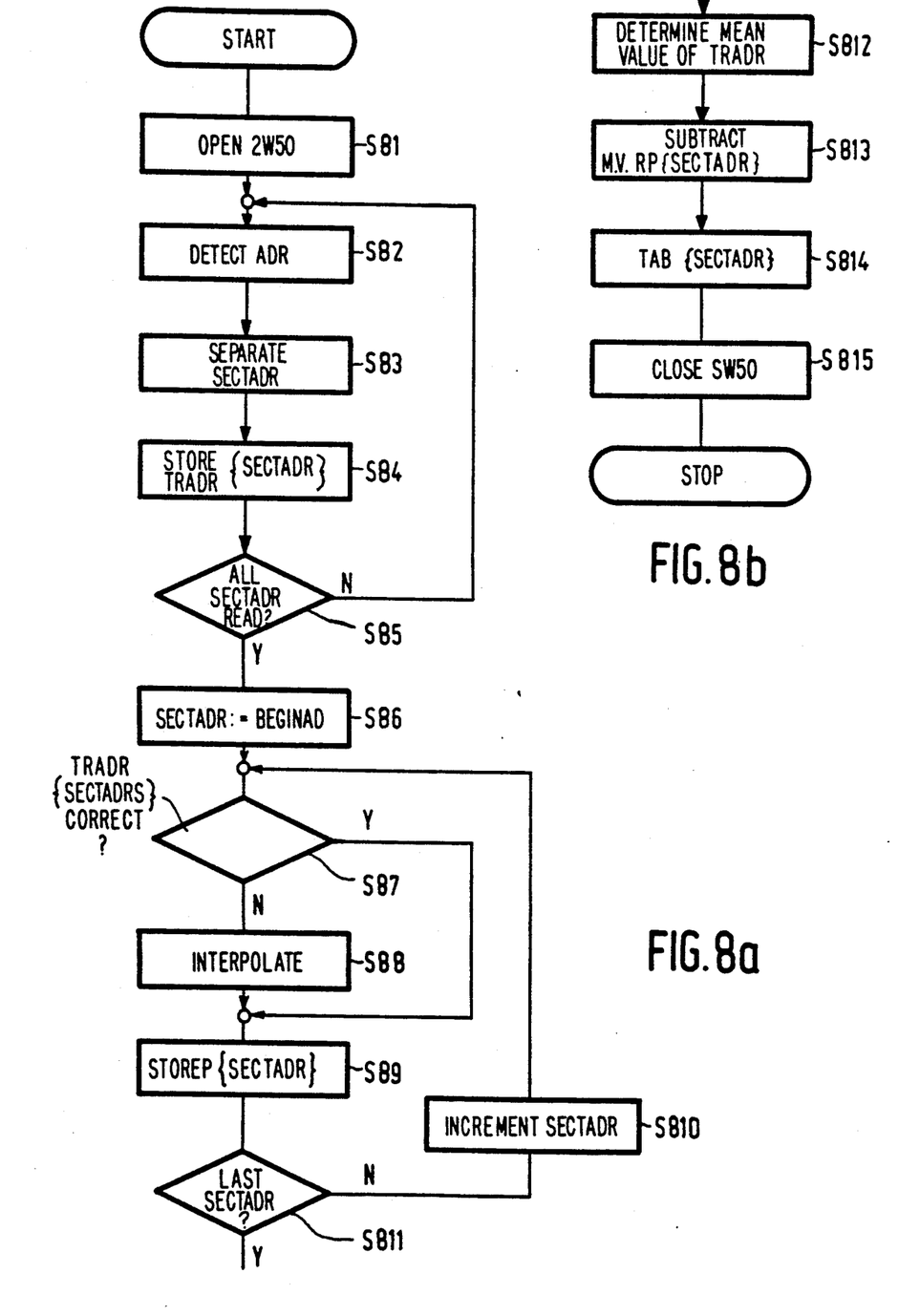

Since the desired correction signal Vc should produce a radial displacement opposite to the eccentricity error, the desired correction signal can be derived from the eccentricity error if the relationship between the correction value and the resulting radial displacement of the point of incidence is known. FIG. 8 by way of example gives a flow chart of a program to be carried out by the computer system 27 to determine the correction values of the correction signal Vc and the storage of specific correction values in the table TAB. After the program has been called the switch 50 is opened in step S81, so that the feedback of the closed-loop tracking system ceases and the closed-loop tracking system is consequently disabled.

In step S82 the next address in the address signal Ua is detected. As described already, each address comprises a portion representing the sector address and a portion representing the track address. This sector address SECTADR is derived from the detected address in step S83. In step S84 the portion of the address representing the track address is stored in a cable TRADR, the storage location in the table being indicated by the associated sector address SECTADR.

In step S85 it is ascertained whether the addresses of all sectors have been detected. If not, the program proceeds with steps S82. If so, it is ascertained during steps S86, . . . , S811 whether the track addresses contained in the addresses stored in the table TRADR have been read correctly. First of all, the sector address SECTADR is set to an initial value BEGINAD in step S86. Subsequently, it is ascertained in step S87 whether the track address in the table TRADR, as indicated by SECTADR, has been read correctly. This may be effected, for example, by comparing the indicated address with the immediately preceding or following track address in the table. If a track address has been read correctly, the difference between the preceding and following track address will be small, as is apparent from FIG. 7. This will not be the case for an incorrectly read address. In FIG. 7 an incorrectly read address is indicated by a dot 60. In addition to the most significant address byte and the least significant address byte the complementary values of these address bytes are recorded by means of code symbols in the present embodiment of the record carrier 1. The correctness of the track address read can then be verified very simply and reliably by detecting whether the most significant address byte and the associated complementary byte are in agreement. If it follows from step S87 that a track address has been read incorrectly an estimate of the correct address is derived from the adjacent track addresses by means of a customary interpolation algorithm in step S88. In FIG. 7 a track address derived by linear interpolation is indicated by a dot 61. After the steps S87 and S88 the correct track address is stored in a table RP in step S89. In step S811 it is ascertained whether all track addresses from the table TRADR have been tested and, if necessary, corrected. If not, the sector address SECTRADR is incremented (S810) and steps S87, . . . S89 are repeated. If so, the mean value of the track addresses stored in the table RP is determined in step S812 and subsequently, in step S813, this mean value is subtracted from the track addresses stored in the table RP. The values stored in the table RP now represent the eccentricity error as a function of the sector address SECTADR and hence the angular position θ of the record carrier 1. In step S814 by multiplication of the eccentricity-error values in the table RP the correction value of the correction signal Vc from table TAB is determined, the multiplication factor K indicating the relationship between the eccentricity error and the correction value of the correction signal Vc. In step S815 the switch 50 is closed again. The multiplication factor K depends on the track pitch and the transfer characteristic of the beam-deflecting means in the write/read head 23. As in general the track pitch is not the same for all record carriers the optimum multiplication factor K also depends on the record carrier.

Figure 10:
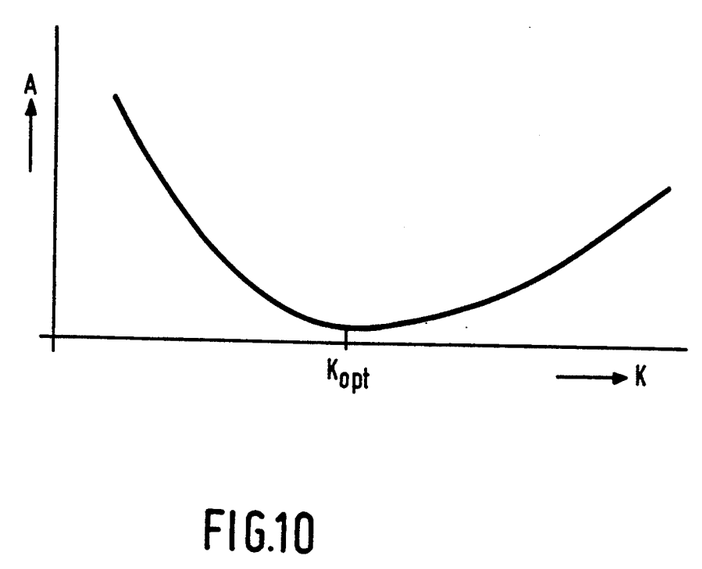
FIG. 10 drives the relationship between a multiplication factor and the residual eccentricity error when the open-loop tracking system is operative.

FIG. 10 by way of illustration gives the amplitude A of a residual eccentricity error as a function of the multiplication factor K, in the case that the radial position of the point of incidence is controlled exclusively by the open-loop tracking system.

Figure 9:
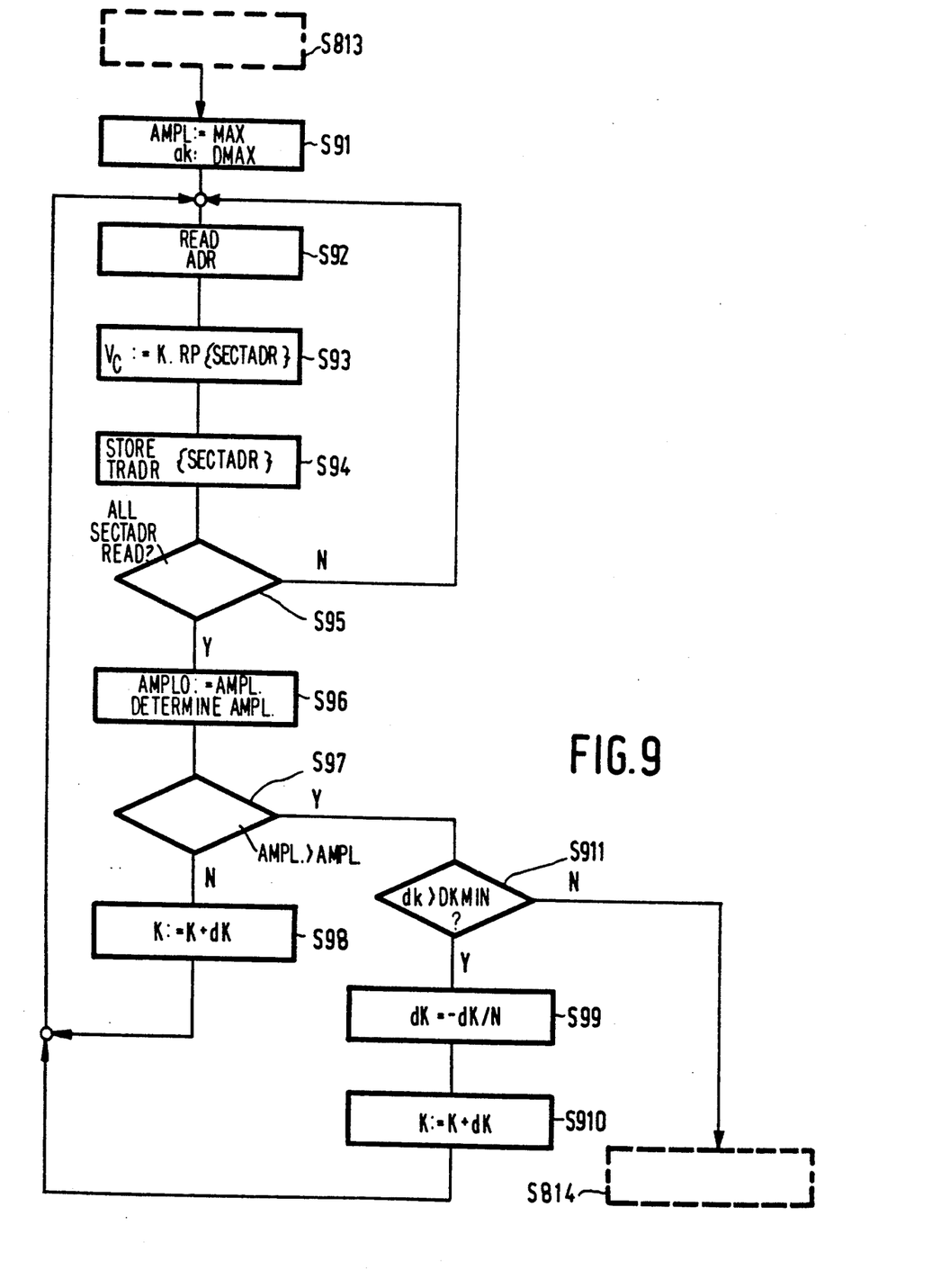

FIG. 9 shows a flow-chart of a program for determining the optimum multiplication factor Kopt for which the amplitude A exhibits a minimum. This program is carried out after step S813 and before step S814. This program comprises an initializing step S91, in which a variable AMPL is set to a predetermined maximum value. This variable AMPL represents the amplitude A of the residual eccentricity error. Further, in step S91 initial values for K and for a value dK for adapting the multiplication factor are adjusted. Subsequently, during the program loop comprising steps S92, ..., S95 the radial position of the point of incidence of the radiation beam is controlled by the correction signal Vc dictated by K and the eccentricity error stored in the table RP (S92 and S93).

Moreover, in step S94 the track address portion of the addresses read is stored in the table TRADR as a function of the sector address read SECTADR. In step S95 it is ascertained whether all sector addresses have been detected and consequently whether the record carrier has made one full revolution. If not, the program loop is traversed again. If so, in step S96 the variable AMPLO is equalized to the last value of the variable AMPL and subsequently the new value AMPL indicating the residual eccentricity error in the case of open-loop tracking control is derived from the track addresses stored in the table TRADR. In step S97 it is ascertained whether the new value for AMPL is greater than the previous value indicated by AMPLO. If the new amplitude AMPLO of the residual eccentricity value is not greater than the old value AMPLO for this error, the multiplication factor K is adapted by the adaptation value dK in step S98. Subsequently, step S92 is repeated, so that the radial position of the point of incidence of the radiation beam is controlled with a correction signal Vc which is also adapted as a result of the adaptation of K. In step S96 the amplitude AMPL of the residual eccentricity error is determined again, after which in step S97 the new value determined for the amplitude AMPL is again compared with the preceding value. As long as the value AMPL is smaller than the value AMPLO the minimum value for the amplitude A of the residual eccentricity error is not yet reached and the multiplication factor is adapted in step S98. However, as soon as the value AMPL is greater than AMPLO the minimum amplitude is exceeded. In that case the absolute value of dK is reduced and the sign of the adaptation value dK is inverted in step S99 to adapt the multiplication factor K by means of the new adaptation value dK. As a result of this the multiplication factor K is adapted again to obtain the optimum value Kopt.

Subsequently, the adaptation value remains constant until the minimum amplitude is passed again, after which the absolute value of dK is reduced and the sign of dK is inverted again. In this way the value of the multiplication factor will converge towards the optimum value Kopt for which the residual eccentricity error is minimal. As soon as the absolute value dK has become smaller than a specific minimum value Kmin, the multiplication factor K is a sufficiently close approximation to the optimum value and the program is terminated (step S911).

It is to be noted again that the above program for determining the optimum gain factor K from the residual eccentricity error is only one of the multitude of programs which are possible. Essential in determining the multiplication factor is that the residual eccentricity error for a number of different values of K is determined and subsequently such a value is selected for the multiplication factor K that the amplitude of the residual eccentricity error is minimal.

In the embodiment of the record carrier described in the foregoing the address bytes of the address are recorded by means of code symbols suitable for differential detection. In practice, it is found that if differential detection is applied the number of addresses read incorrectly when the closed-loop tracking system is inoperative is very small.

This may be attributed to the fact that in the case of differential detection a predetermined number of local maxima in the read signal are determined. As a result of the crosstalk in the read signal produced by adjacent code symbols the heights of the maxima will be influenced, but generally they will remain detectable.

If the code symbols are detected by means of level detection the effect of crosstalk will be greater. An embodiment of the record carrier in which the negative effect of crosstalk on the correctness of the address signals read is reduced substantially will now be described with reference to FIG. 11. In this Figure the radially adjacent address information patterns 8 again comprise four code symbols 13, 14, 15 and 16, the code symbol 13 and the code symbol 14 again representing the most significant address byte and the least significant address byte respectively.

Figure 11:
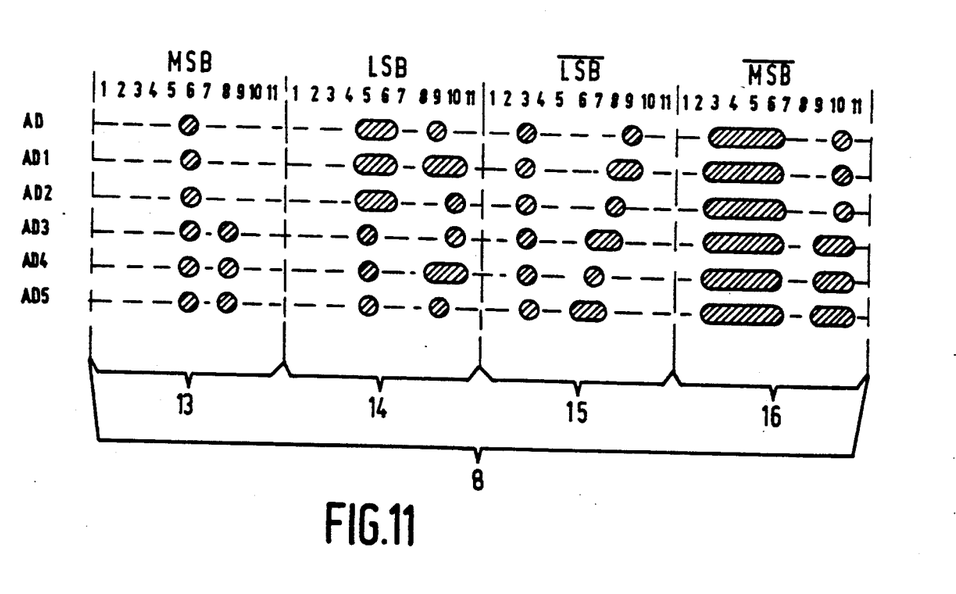
FIG. 11 shows the address-information patterns for an embodiment of the record carrier in accordance with the invention.

The code symbols 15 and 16 again represent the complementary values of the least significant address byte and the most significant address byte respectively. The code symbols shown in FIG. 11, however, do not comprise 15 potential pit positions, as in FIG. 11, but eleven potential pit positions. Moreover, the number of pit positions occupied by pits is not always the same. The code symbols in FIG. 11 are selected in such a way that two radially adjacent code symbols exhibit a difference for not more than one of the eleven pit positions. If the code symbols are scanned while the closed-loop tracking system is inoperative, in order to read the addresses (AD, ..., AD+5) represented by the code symbols, the influence of the radially adjacent code symbols is very small because the structures of adjacent code symbols exhibit only a minimal difference.

| Legend to the program steps in the Figures: | |
|---|---|
| S81 | : OPEN SW50 |
| S82 | : DETECT ADR |
| S83 | : SEPARATE SECTADR |
| S84 | : STORE TRADR {SECTADR} |
| S85 | : ALL SECTADR READ? |
| S86 | : SECTADR:=BEGINAD |
| S87 | : TRADR {SECTADR} CORRECT? |
| S88 | : INTERPOLATE |
| S89 | : STORE RP {SECTADR} |
| S810 | : INCREMENT SECTADR |
| S811 | : LAST SECTADR? |
| S812 | : DETERMINE MEAN VALUE OF TRADR |
| S813 | : SUBSTRACT MEAN VALUE FROM ALL RP {SECTADR} FOR ALL SECTADR |
| S814 | : TAB {SECTADR} :=K.RP {SECTADR} FOR ALL SECTADR |
| S815 | : CLOSE SW50 |
| S91 | : AMPL:=MAX |
|  | : dK:=DMAX |
| S92 | : READ ADR |
| S93 | : Vc: =K.RP {SECTADR} |
| S94 | : STORE TRADR {SECTADR} |
| S95 | : ALL SECTADR READ? |

-continued

| Legend to the program steps in the Figures: | |
|---|---|
| S96 | : AMPL0:=AMPL |
|  | : DETERMINE NEW AMPL. FROM TRADR |
| S97 | : AMPL. GREATER THAN AMPL0? |
| S98 | : K:=K+dK |
| S99 | : dK=−dK/N |
| S910 | : K:=K+dK |
| S911 | : /dK/GREATER THAN DKMIN? |

What is claimed is:

1. Information recording and reading system comprising a record carrier provided with information tracks which are arranged substantially concentrically relatively to a common center, the record carrier being divided into sectors and the tracks of each sector containing address information in the form of optically detectable radially juxtaposed address information patterns, the address information being indicative of the radial position of the track relative to the center, and apparatus for recording and reading information on the information tracks, which apparatus comprises a drive means for rotating the record carrier about a center of rotation, means for scanning the information tracks by using a radiation beam for the purpose of recording and reading information on the information tracks, a closed-loop tracking system for keeping the radiation beam aimed at the information track to be scanned, and an angular-position detection system for determining the angular position of the record carrier, and the recording and reading apparatus comprising means for deriving a correction signal from the address information read while the tracking system is inoperative, which correction signal is related to the radial displacement of the point of incidence of the radiation beam on the record carrier relative to the center while the tracking system is inoperative, means for storing the correction signal thus derived in a memory as a function of the angular position, the tracking system comprising means for fetching the correction value associated with the instantaneously determined angular position from the memory and an open-loop control system for controlling the radial position of the point of incidence relative to the center of rotation depending on the fetched correction signal to compensate for the radial displacement of the point of incidence caused by an eccentric position of the center of rotation and out-of-roundness of the information tracks, and the correction signal being substantially proportional to the radial displacement of the point of incidence relative to the center while the tracking system is inoperative, the scanning device comprising means for optimizing the correction signal in an optimization time interval in which the radial position of the point of incidence is controlled exclusively by the open-loop control system, for which purpose the optimizing means includes means responsive to the address information read in the optimization time interval to adjust the amplitude of the correction signal to a value for which the amplitude of the radial displacement of the point of incidence as indicated by the addresses read is minimal.

2. A system as claimed in claim 1, characterized in that the correction signal deriving means includes address-error detection means for detecting incorrectly read address information and means for correcting the incorrectly read addresses being detected.

3. A system as claimed in claim 1, characterized in that the address information comprises a plurality of address bytes, two consecutive ones of said address bytes, including one address byte representing the most significant part of the address, being each other's complement and the address error detection means being adapted to derive the correctness of the address information being read from said complementary address bytes.

4. A system as claimed in claim 1, characterized in that the address information patterns comprise optically detectable code symbols which each represent at least one byte of the address information, each symbol comprising a plurality of positions, a number of positions being occupied by an optically detectable mark and the relationship between the addresses and symbols being selected in such a way that two radially adjacent code symbols always exhibit a difference for one position at the most.

* * * * *